No. 842,200. PATENTED JAN. 29, 1907.
H. HESS.
MAGNETO.
APPLICATION FILED JUNE 15, 1906.
2 SHEETS—SHEET 1.
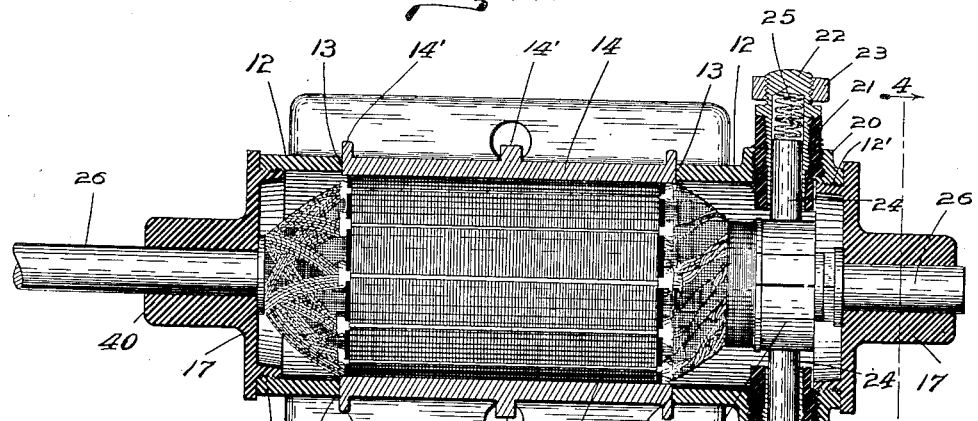
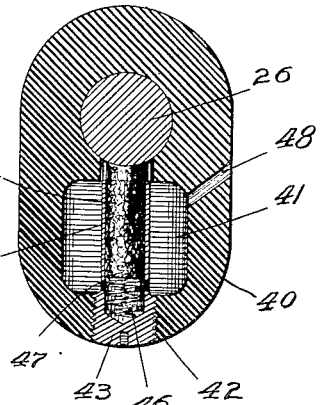
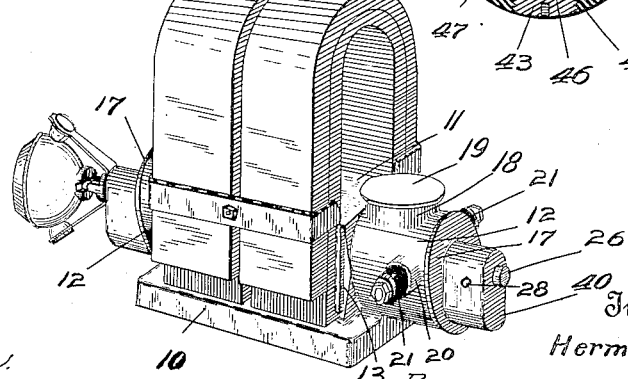
Witnesses
Vernon Plummer
Frank A. Fahle
Inventor
Herman Hess.
By Bradford Hood
Attorneys No. 842,200.  
PATENTED JAN. 29, 1907.  
H. HESS.  
MAGNETO.  
APPLICATION FILED JUNE 15, 1906.  
2 SHEETS—SHEET 2.
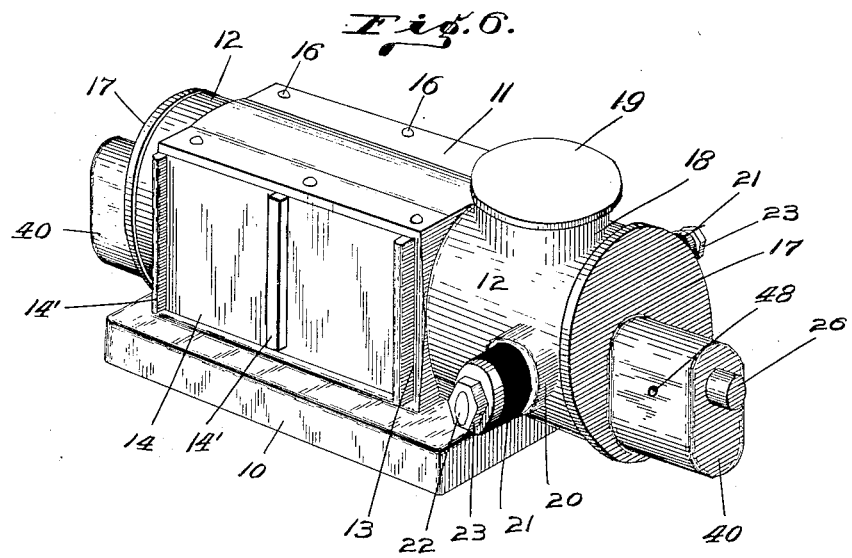
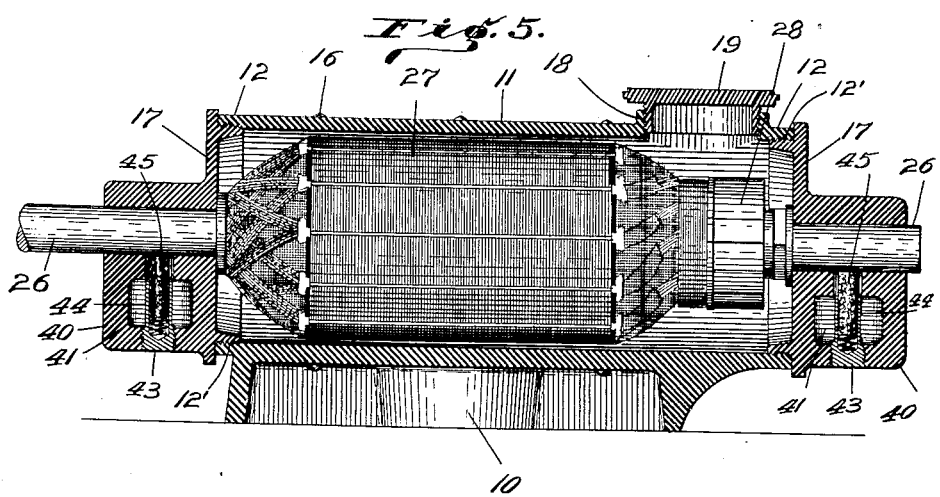
Witnesses  
Vernon Plummer  
Frank A. Sahle  
Inventor  
Herman Hess.  
By Bradford & Hood  
Attorneys

UNITED STATES PATENT OFFICE.

HERMAN HESS, OF INDIANAPOLIS, INDIANA.

MAGNETO.

No. 842,200.     Specification of Letters Patent.     Patented Jan. 29, 1907.

Application filed June 15, 1906. Serial No. 321,787.

*To all whom it may concern:*

Be it known that I, HERMAN HESS, a citizen of the United States, residing at Indianapolis, in the county of Marion and State of Indiana, have invented certain new and useful Improvements in Magnetos, of which the following is a specification.

The object of my invention is to produce a magneto-generator which may be cheaply manufactured and which will be substantially dust and moisture proof.

A further object of my invention is to provide a main-body and pole-piece construction such that the parts may be assembled and held together without screws, so that the machine will be especially adapted for use in connection with automobiles and other machines subjecting the magneto to continuous jarring.

A further object of my invention is to provide such improvements in details of construction as shall be hereinafter pointed out.

The accompanying drawings illustrate my invention.

Figure 1 is a perspective view of a complete machine embodying my invention; Fig. 2, an axial section with the magnets omitted; Fig. 3, a transverse section; Fig. 4, a section on line 4 4 of Fig. 2; Fig. 5, an axial vertical section, and Fig. 6 a perspective of my machine stripped of its magnets.

The main body of the machine is cast in a single piece from suitable material—such, for instance, as brass—and this main body comprises a base portion 10, a box-like armature-receiving portion 11, and a pair of cylindrical extensions 12 12, projecting from opposite ends of the portion 11. Portion 11 is provided at opposite sides with pole-receiving perforations 13 13, into each of which is firmly pressed an iron pole-piece 14. Care is taken that the pole-pieces fit the openings 13 very closely, so that they must be pressed in with considerable force, and this is done before the pole-pieces are machined. After the pole-pieces have been pressed in holes 15 are drilled through the top and bottom places of the box-like portion 11 and into the pole-pieces, and iron rivets or pins 16 are then driven and swelled into these holes. Thereupon the main body is clamped upon a lathe face-plate and the pole-pieces machined internally to the proper diameter, the outer ends of the portions 12 being at the same time threaded at 12' to receive heads 17 17. One of the portions 12 is provided with an upwardly-extending circular flange 18, which gives access to the interior of the main body immediately over the commutator, and this flange is threaded to receive a cap 19. The same portion 12, which carries the flange 18, carries at opposite sides flanges 20, which are internally threaded to receive the insulating-bushings 21, which extend into the interior of said portion 12 a considerable distance. Each bushing 12 is threaded internally to receive a metallic shell 22, to which a wire may be attached at its outer end by means of a nut 23. The nut 23 may be of considerable size and will serve to hold a wire much more securely than the usual small screw. The shell 22 does not extend beyond the inner end of the bushing 21, and said shell is adapted to receive a brush 24 of any standard pattern, said brush being urged inwardly by means of the usual spring 25. The member 22 may be hollow nearly its entire length even beneath the nut 23, and as a consequence the spring 25 may be of considerable length while the total projection of the holder from the main body is reduced to a minimum.

Journaled in the heads 17 is the usual armature-shaft 26, carrying an armature 27 and a commutator 28. By extending the bushings 21 into the main body and fairly closely adjacent the circumference of the commutator and keeping the metallic shell 22 from extending inwardly beyond the inner end of the insulating-bushing no dust can accumulate upon the brushes to such an extent as to form a short circuit from the brush to the main casing, and consequently this very common difficulty found in other machines is entirely eliminated.

The magnets 30 are clamped upon the pole-pieces 14 in the usual manner by a clamping-bolt, tending to draw the ends of the magnet together upon the pole-pieces, said pole-pieces being provided at opposite ends with short flanges 14', which prevent displacement of the magnets. By using iron pins 16 the magnets serve to hold them against displacement, so that even should they become loose in the pole-pieces they will not be shaken out.

In order to lubricate the armature-shaft, I provide each head 17 with an extension 40, within which beneath the shaft is formed an oil-chamber 41. Communicating with the chamber 41 at its bottom is a threaded opening 42, which is slightly tapered outwardly to receive a tapered plug 43. The plug 43 is provided at its inner end with a hollow extension 44, which extends up through chamber 41 to a point close to the shaft 26, and mounted in said extension is a suitable absorbent wick 45, which is normally urged upward by a spring 46. Holes 47 are formed through the extension 44 near the bottom of chamber 41, and a passage 48 forms an inlet to the chamber 41 near its top.

I claim as my invention—

1. In a magneto, the combination of the main hollow single piece non-magnetic body having pole-openings formed through opposite sides thereof, magnetic pole-pieces forced into said openings, magnetic fastening members passing through said non-magnetic body into the poles, a pair of heads, having shafting-bearings formed therein, said heads closing the opposite ends of the main body and forming bearings for the armature-shaft, the armature-shaft and armature, and a collecting member coöperating with said armature, all substantially as and for the purpose set forth.

2. In a magneto, the combination of the main hollow single piece non-magnetic body having pole-openings formed through opposite sides thereof, magnetic pole-pieces forced into said openings, fastening members passing through said non-magnetic body into the poles, a pair of heads having shafting-bearings formed therein, said heads closing the opposite ends of the main body and forming bearings for the armature-shaft, the armature-shaft and armature, and a collecting member coöperating with said armature, all substantially as and for the purpose set forth.

In witness whereof I have hereunto set my hand and seal at Indianapolis, Indiana, this 1st day of June, A. D. 1906.

HERMAN HESS. [L. S.]

Witnesses:
ARTHUR M. HOOD,
THOMAS W. MCMEANS.